United States Patent [19]

Johnson et al.

[11] Patent Number: 4,877,526
[45] Date of Patent: Oct. 31, 1989

[54] FLEXIBLE FILTER BAG AND METHOD OF FABRICATION

[75] Inventors: Todd W. Johnson; Corazon C. Brizuela, both of St. Paul, Minn.

[73] Assignee: Minnesota Mining and Manufacturing Company, St. Paul, Minn.

[21] Appl. No.: 95,441

[22] Filed: Aug. 31, 1987

[51] Int. Cl.$^4$ .............................................. B01D 29/12
[52] U.S. Cl. ................................ 210/448; 210/483; 210/489; 210/493.1; 210/497.01; 383/117; 493/189; 493/214; 493/243; 493/260; 493/303; 493/308; 55/363; 55/DIG. 5; 55/DIG. 26
[58] Field of Search ............... 55/341 PC, 363, 364, 55/368, 378, 380, 381, 382, DIG. 26, DIG. 5, 498, 520, 523; 210/448, 452, 483, 488, 489, 493.1, 497.01, 497.1, 494.1, 497.2, 497.3, 494.4, 321.83, 487, 493.4, 497.1; 493/186, 210, 214, 243, 255, 259, 303, 308, 260, 267, 299, 393, 394, 408, 453, 941, 189; 112/422, 423, 440, 262.2; 156/304.7; 383/102, 109, 114, 117

[56] References Cited

U.S. PATENT DOCUMENTS

| | | | |
|---|---|---|---|
| 1,585,246 | 5/1926 | Hay | 210/448 |
| 2,364,069 | 12/1944 | Hahn | 55/368 |
| 3,006,480 | 10/1961 | Russell | 55/520 |
| 3,037,637 | 6/1962 | Bub | 210/493.4 |
| 3,457,707 | 7/1969 | Fesco | 55/378 |
| 4,398,931 | 8/1983 | Shevlin | 55/523 |
| 4,543,113 | 9/1985 | Forester et al. | 55/523 |
| 4,545,833 | 10/1985 | Tafara | 210/497.01 |
| 4,600,512 | 7/1986 | Aid | 210/321.83 |

OTHER PUBLICATIONS

The Random House College Dictionary, revised edition, 1980, Random House, Inc. New York, N.Y., p. 295.

Primary Examiner—Richard V. Fisher
Assistant Examiner—Wanda L. Millard
Attorney, Agent, or Firm—Donald M. Sell; Walter N. Kirn; David W. Anderson

[57] ABSTRACT

A flexible filter bag, the filter element of which is seamless and avoids prior leakage problems, is made by wrapping a flexible, preferably perforated, filtering fabric and a flexible nonfiltering transport material together onto a cylindrical mandrel to provide a tube. A thin metal ring is fitted into the tube, and the portion of the filtering fabric which extends beyond the edge of the transport material is folded inwardly around the ring to provide a cuff. A sleeve of a length about twice that of the tube is inserted into and pulled over the tube until the free ends of the sleeve are approximately coterminous with the ring-free end of the tube. The free ends of the sleeve and tube are gathered in the manner of a sausage casing and then subjected to pressure to form a seal, but the convolutions of the transport material terminate just short of the seal so as to avoid bunching at the seal.

24 Claims, 1 Drawing Sheet

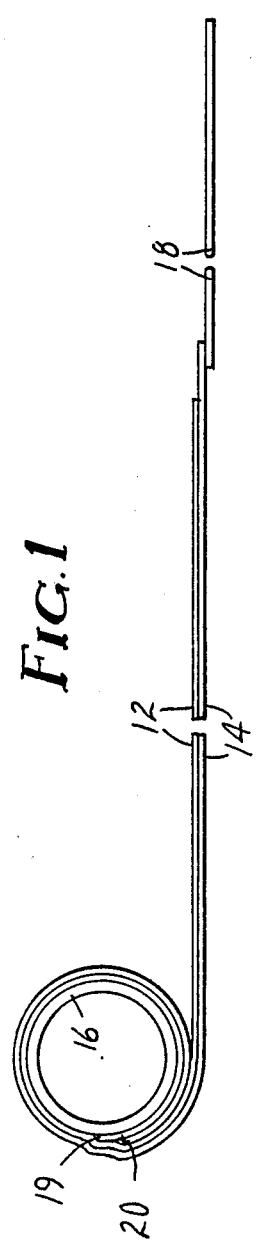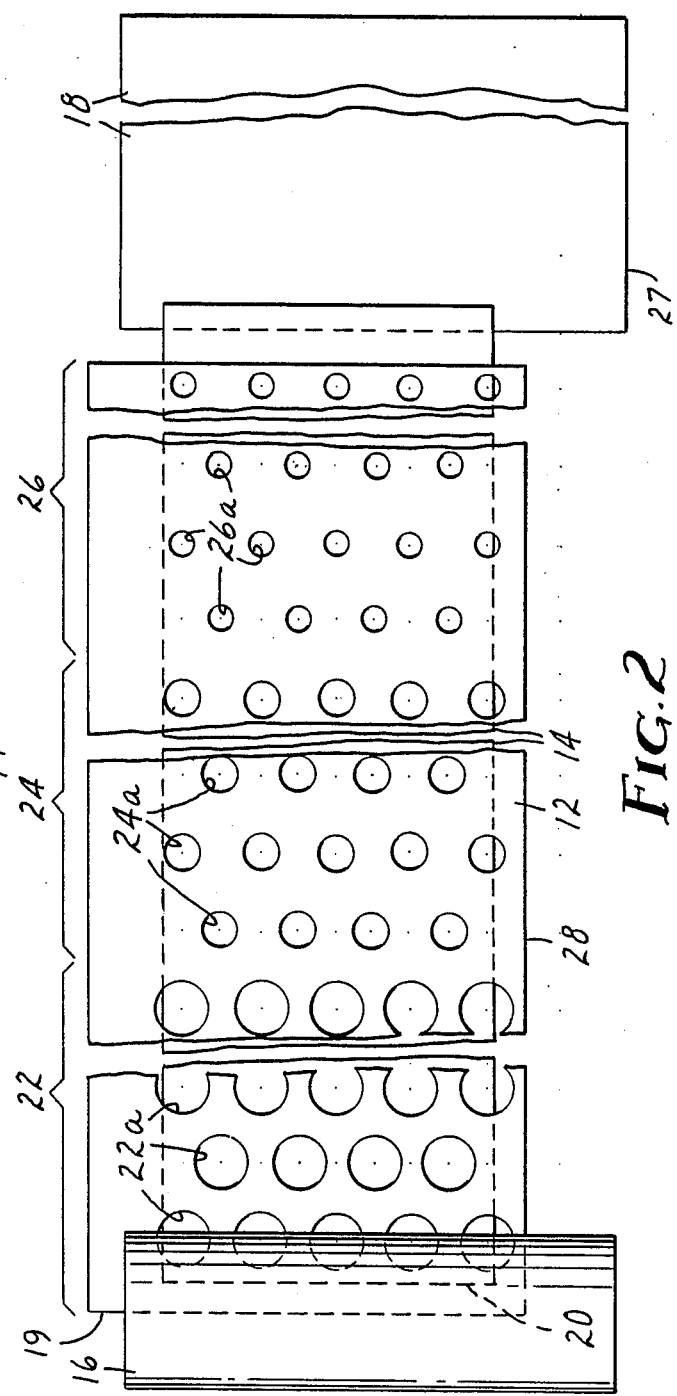

FLEXIBLE FILTER BAG AND METHOD OF FABRICATION

BACKGROUND ART

1. Field of the Invention

The invention concerns a flexible filter bag that is open at one end to receive a fluid to be filtered under pressure while the filter bag is fitted either into or over a rigid filter basket. The invention also concerns a method for making such a bag.

2. Description of the Related Art

Liquid filtering apparatus employing a flexible filter bag has been known since at least 1925. As indicated in Tafara U.S. Pat. No. 4,545,833, most filter bags have sewn seams extending both longitudinally and across the closed end. Leakage through holes formed by the sewing needle permits unfiltered liquid to pass, thus contaminating the filtered liquid. The open end of the bag is folded inwardly around a thin metal ring by which the bag is sealed to the filtering apparatus. The longitudinal seam can prevent the bag from fitting tightly against the ring, thus providing an additional leakage site.

Tafara's answers to the needle-holes leakage was to employ heat and pressure to form fused seams extending both longitudinally and across the closed end of the filter bag. Because such a fused longitudinal seam should be flush with the surface of the filter bag, it should also avoid the leakage at the metal ring that had been encountered with sewn seams. Among possibly significant drawbacks in Tafara's bag are the difficulty of determining whether the fused seams are completely sealed. Also, the fused seams reduce the flexibility of the bag.

A flexible liquid-filtering bag which has sewn longitudinal and end seams is shown in UK Patent Application No. GB 2,168,906A which was published July 2, 1985. See also Gravley U.S. Pat. No. 3,937,621 and Schmidt, Jr. U.S. Pat. No. 4,247,394.

SUMMARY OF THE INVENTION

The invention provides a flexible filter bag, the filter element of which is seamless and avoids prior leakage problems as well as the aforementioned drawbacks of the Tafara filter bag. The invention also provides an economical method for making the novel bag. A preferred flexible filter bag of the invention is made of:

- a flexible filtering fabric of thermoplastic fibers, which fabric is wound upon itself in a large number of convolutions to provide a tube, one end of the tube being folded inwardly around a structural ring to form a cuff, the other end of the tube being gathered in the manner of a sausage casing and sealed,
- a flexible, fluid-permeable sleeve covering the outer face of said tube with one end of the sleeve extending around said cuff, and
- means for securing the other end of the sleeve to the sealed end of the tube so that the sleeve and tube together form a flexible filter bag that is open only at said ring.

When a fine pore size is desired, the flexible filtering fabric preferably is made of blown microfibers. Especially useful are blown polypropylene microfibers which are economical, provide excellent filtering, and can be fused under pressure at ordinary room temperatures, thus assuring against leakage at the closed (sealed) end of the tube.

When a relatively large pore size is desired, a preferred flexible filtering fabric is a coarse-fiber such as spunbonded nonwovens or felts. To attain the finest pore size, the filtering fabric may be a membrane material.

The above-desribed preferred flexible filter bag of the invention can be fitted into a rigid cylindrical filter basket of a high-pressure filter vessel to filter fluids flowing into the open end of the filter bag and radially outward through the filter bag. To ensure a reliable mechanical seal at the ring, the structural ring preferably is rigid, such as a metal, but may be made of any material that is sufficiently resistant to compression for a good seal to be made. For example, the structural ring can be rubber or a polymer such as polypropylene. A rubber or thermoplastic ring can be fused to the filtering fabric of the novel filter bag to provide greater assurance against leakage at the ring when the open end of the bag is mechanically sealed to a pressure filter vessel.

Preferably the flexible filter bag is made using a long strip of a flexible filtering fabric provided with a large number of openings, e.g., perforations. The strip is convolutely wound onto a cylindrical mandrel together with a strip of transport material followed by one or more convolutions of imperforate flexible filtering fabric. One end of the resulting tube, after being removed from the mandrel, can be folded inwardly around a structural ring to form a flexible filter bag of the invention that is sealed at the other end. When used to filter fluid fed into the open end of the bag to exit radially outwardly, the filtering fabric is wound so that the total area of openings in each convolution of its filtering fabric is larger than that of any of its more outward convolutions.

Each intermediate layer of the strip of transport material functions to commingle unfiltered fluid passing through the openings of the adjacent upstream filtering layer with fluid that has been filtered by that layer and to distribute the commingled fluids as uniformly as possible over the inner surface of the next downstream convolution of filtering fabric. The effect of the openings in combinations with the transport material is to distribute the collected contaminant fairly equally through the various convolutions of filtering fabric, thus prolonging the useful life of the filter bag.

When a flexible filter bag of the invention is to be used in a pressure filter vessel, at least the portion of the sleeve that covers the outer face of the aforementioned tube should be a tough, reinforcing fabric. Preferably a portion of the sleeve also covers the inner face of the tube, which portion may have a porosity selected to filter out from the fluid substantially all particles that could otherwise become lodged in the transport material, but not to filter out significantly smaller particles. If a particle of such size were to become lodged in a layer of the transport material, that probably would occur immediately downstream of an opening in a convolution of the filtering fabric, thus blocking the flow of fluid through that opening. Excellent results have been realized when the inner portion of the sleeve is a material identical to the transport material.

When the sleeve has differing inner and outer portions, they can be sewn together at a circumferential seam that should be positioned on the inner face of the tube of filtering fabric close to the ring.

THE DRAWING

The invention may be more easily understood in reference to the drawing, all figures of which are schematic. In the drawing:

FIG. 1 is an end view of a cylindrical mandrel being wrapped with strips of fabric to form a tube in the fist step of making a preferred flexible filter bag of the invention;

FIG. 2 is a plan view showing perforations in a strip of fabric used in FIG. 1 and the alignment of it and the other fabrics;

Figure 3:
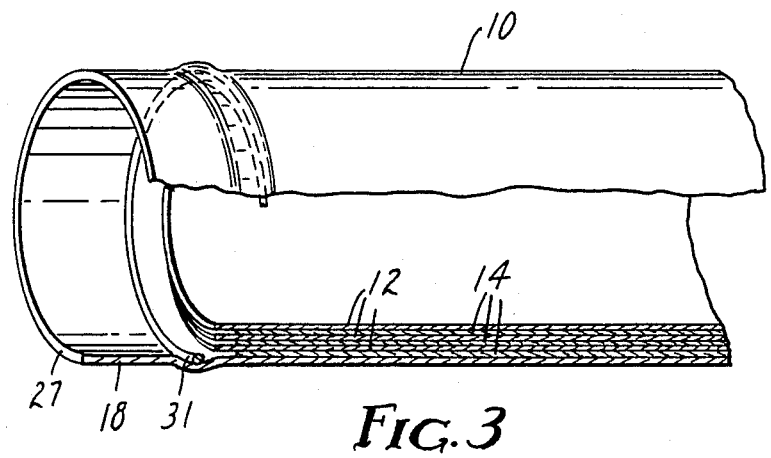
FIG. 3 is a perspective view showing the tube formed as indicated in FIGS. 1 and 2, partly broken away to a central section.

The flexible filter bag made as illustrated in FIGS. 1-5 is designed to be inserted into a rigid cylindrical filter basket of a high-pressure filter vessel to filter fluids flowing into an open end of the filter bag and radially outward through the filter bag. In the first steps of making the flexible filter bag, a tube 10 is made by wrapping a first flexible filtering fabric 12 of thermoplastic fibers and a flexible fluid-permeable nonfiltering transport material 14 together onto a cylindrical mandrel 16 and then overwrapping with a second flexible filtering fabric 18 as shown in FIGS. 1 an 2. The leading edge 19 of the first filtering fabric 12 is placed against the mandrel, and the leading edge 20 of the transport material 14 is placed a short distance behind the leading edge 19 of the first filtering fabric.

As seen in FIG. 2, the transport material 14 is somewhat narrower than the first filtering fabric 12. A length 22 of the first filtering fabric 12 beginning at its leading edge 19 and extending for a distance approximating one circumference of the mandrel 16 is formed with a plurality of circular perforations 22a of uniform size. A second length 24 between approximately one and two circumferences of the mandrel 16 is formed with a plurality of circular perforations 24a of uniform size, each smaller in area than are the perforations 22a; while over a third length 26 between approximately two and three times the circumference, the first filtering fabric is formed with circular perforations 26a, each smaller in area than the perforations 24a. The second filtering fabric 18 is free from such perforations and has sufficient length to form several convolutions. A longitudinal edge 27 of the second filtering fabric 18 is offset beyond the corresponding longitudinal edge 28 of the first filtering fabric 12.

Figure 5:
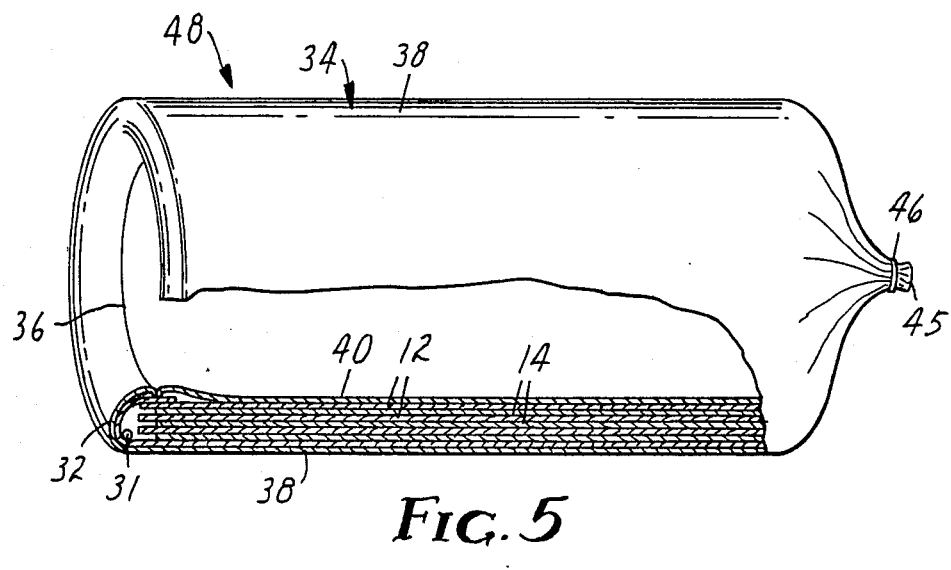
FIG. 5 is a perspective view of the flexible filter bag made as illustrated in FIGS. 1-4 and in part broken away to a central section.

After removing the tube 10 from the mandrel 16, a rigid thin metal ring 31 is fitted as shown in FIG. 3 into the tube inside the offset longitudinal edge 27 of the second filtering fabric 18 but not inside the first filtering fabric 12, whereupon the convolutions of the offset longitudinal edge 27 are folded inwardly around the ring 31 to form a cuff 32 (see FIG. 5). Because both the first filtering fabric 12 and the transport layer 14 terminate short of the ring, there is no bunching at the ring when the cuff is formed.

Figure 4:
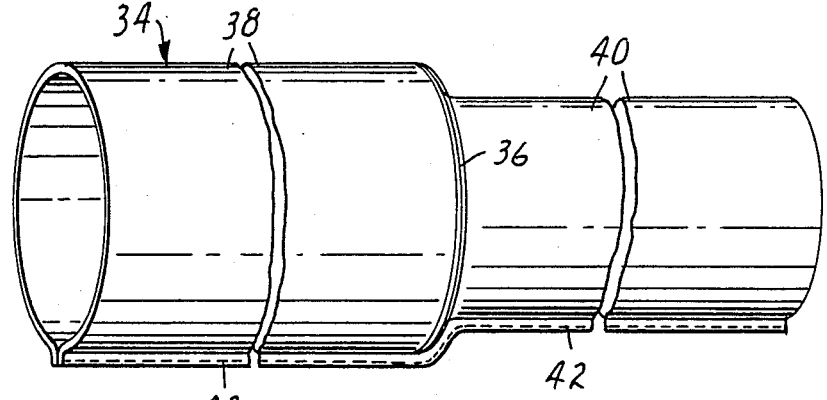
FIG. 4 is a perspective view of a porous sleeve to be used with the tube of FIG. 3 to make the flexible filter bag.

A flexible sleeve 34 as shown in FIG. 4 is made by joining at a circumferential seam 36 a tough, reinforcing fabric cover 38 and a prefiltering fabric 40, each of which offers little resistance to the flow of fluid to be filtered. Both the cover 38 and the prefiltering fabric 40 have a sewn longitudinal seam 42. The diameter of the portion of the sleeve formed by the prefiltering fabric 40 permits it to be easily inserted into the tube 10 until its circumferential seam 36 faces the inside of the tube close to the ring 31. The larger diameter of the reinforcing fabric cover 38 permits it to be pulled over the tube 10 until its free end is approximately coterminous with the ring-free end of the tube. After doing so, the free ends of the cover and the tube are gathered in the manner of a sausage casing and then subjected to pressure, thus fusing the thermoplastic fibers of both the filtering fabrics 12 and 18 to form a seal 45. The convolutions of the prefiltering fabric 40 and the transport material 14 terminate just short of the seal 45 so as to avoid bunching or leakage at the seal.

When the reinforcing fabric cover 38 is made of thermoplastic fibers, they fuse together with the fibers of the first and second filtering fabrics 12 and 18 and thus form part of the seal 45. A metal clamp 46 is secured over the seal 45 as shown in FIG. 5 to provide a flexible filter bag 48 of the invention. The clamp 46 ensures against delamination of the fused fibers under high fluid-filtering pressures.

In use, the flexible filter bag 48 is fitted into a rigid filter basket of a pressure filter vessel (not shown) and is clamped at its ring end to receive fluid through the orifice within the ring 31. A portion of the fluid passes through the perforations 22a without being filtered by the first or innermost convolution 22 of the first filtering fabric 12. After those portions have been commingled by passing through the adjacent downstream convolution of the transport fabric 14, part of those commingled portions of the fluid passes through the perforations 24a without being filtered by the imperforate second convolution 24 of the filtering fabric. Eventually, all of the fluid is filtered by the downstream convolutions of the second filtering fabric 18.

When a flexible filter bag of the invention contains n convolutions of a perforated first filtering fabric, ideally $100/(n+1)\%$ of unfiltered fluid arrives a each convolution of that fabric and at the innermost convolution of the second filtering fabric. Excellent results have been obtained using a perforated flexible filtering fabric in nine convolutions, each formed with perforations that are smaller than the perforations of any adjacent upstream convolution, and then 10-15 additional convolutions of flexible filtering fabric having no such perforations. A large number of convolutions of the imperforate filtering fabric guards against contamination of the filtered fluid by possible leakage around the edges of one or more of the imperforate convolutions.

While the perforations in the first filtering fabric 12 are shown to be circular, slits or openings of other shapes are also useful.

While the illustrated filter bag is intended to be inserted into a high-pressure filter basket, flexible filter bags of the invention can be fitted over a filter basket to receive fluid circumferentially and to discharge the filtered fluid through the ring end. For such use, the filtering fabrics can be wound with the first-laid convolutions being free from bypass openings and succeeding convolutions formed with increasingly larger bypass openings.

Preferably the prefiltering fabric 40 of the sleeve 34 is of a porosity to remove from the fluid substantially all particles that could otherwise become lodged in the transport layer. On the other hand, its porosity should be such that it does not filter out significantly smaller particles and so offers little resistance to the passage of fluid. When the inner portion of the sleeve is of a porosity that it does not perform this prefiltering, this function can be performed by a convolution of the transport material 14 upstream of the most upstream convolution of filtering fabric.

EXAMPLE 1

The following materials were used to construct a flexible filter bag of the present invention:

FILTERING FABRIC

A polypropylene blown-microfiber (BMF) web having a basis weight of approximately 20 g/m$^2$, a thickness of approximately 0.04 cm, a solidity of approximately 5%, and an equivalent pore size of about 5 μm prepared according to the process described in Wente, Van A., "Superfine Thermoplastic Fibers", Industrial Engineering Chemistry, Vol. 48, pp. 1342-1346 and in Wente, Van A. et al., "Manufacture of Superfine Organic Fibers", Report No. 4364 of the Naval Research Laboratories, published May 25, 1954. [Equivalent pore size was determined as described in 3M Publication No. 70-0701-2170-S, Product Bulletin #1 entitled "Micron Rating and Efficiency".]

TRANSPORT MATERIAL AND PREFILTERING FABRIC

"Fibretex" 150, a 150 g/m$^2$ basis weight, needle-tacked polypropylene spunbond web available from James River Corp., Greenville, S.C., which has an average fiber size of approximately 2-3 denier and a solidity of approximately 13%.

COVER OF THE SLEEVE

"Celestra", a spunbond, pin-bonded polypropylene fabric having a basis weight of approximately 34 g/m$^2$, a thickness of about 0.025 cm, an equivalent pore size of about 20 μm, and a solidity of about 15%, which is available from James River Corp.

The filtering fabric (about 424 cm×94 cm) was drilled to produce a series of perforation patterns, each on 10.2 cm. triangular centers. The sizes of the perforations in each pattern decreased from one end of the strip to the other. The centers of the leading perforations of each pattern were offset 5.1 cm laterally and 5.1 cm longitudinally from the centers of the trailing perforations of the preceding pattern. The length of each pattern from the centers of its leading to its trailing perforations is reported in Table I together with the diameter of its perforations.

TABLE I

| Pattern # | Pattern Length (cm) | Hole Size (mm) |
|---|---|---|
| 1 | 44.5 | 54 |
| 2 | 40.5 | 48 |
| 3 | 40 | 42 |
| 4 | 39.5 | 36 |
| 5 | 49.5 | 30 |
| 6 | 49 | 24 |
| 7 | 41.5 | 18 |
| 8 | 47.5 | 12 |
| 9 | 72 | 6 |

A flexible filter bag of the present invention was made as illustrated in FIGS. 1-5 of the drawing by first laying a strip of the transport material 14 (424 cm×61 cm) on a flat surface and then positioning the abovedescribed perforated filtering fabric (424×94 cm) over the transport material as shown in FIG. 2 of the drawing such that a trimmed longitudinal edge 28 of the perforated filtering fabric extended 5 cm beyond the corresponding edge of the transport material 14. The leading edge 19 of the filtering fabric extended about 2.5 cm beyond the leading edge 20 of the transport material. These were then wrapped around a 13.65 cm diameter (42.9 cm circumference) cylindrical mandrel beginning with the leading edge 19 of the perforated filtering fabric 12. A strip of imperforate second filtering fabric 18 (1080 cm×102 cm) was placed on a flat surface and the wrapped mandrel placed on it such that the leading edge of the imperforate filtering fabric overlapped the trailing edge of the transport material 14 by 5 cm. The longitudinal edge 27 of the imperforate filtering fabric extended about 13 cm beyond the trimmed edge 28 of the perforated filtering fabric 12. The strip of imperforate filtering fabric was then wrapped over the previously wrapped construction, and the resulting tube 10 was removed from the mandrel. As seen in FIG. 3, a stainless steel ring 31 (18 cm in diameter and having a cross-sectional diameter of 0.25 cm) was fitted approximately 7.6 cm into the end of the tube 10, and the extending convolutions of the imperforate filtering fabric 18 were folded inwardly over the ring to form a cuff 32.

A sleeve 34 as shown in FIG. 4 was made so that its cover portion 38 was approximately 19.5 cm in diameter and 100 cm in length and its prefiltering fabric portion 40 was approximately 14 cm in diameter and 60 cm in length. The seams were made with polypropylene thread. The prefiltering fabric portion 40 of the sleeve was inserted into the tube 10 so that its circumferential seam faced the inside of the tube close to the ring 31. The cover portion 38 was folded over the ring 31 and pulled over the outside of the tube 10. The ends of the cover 38 and the filtering fabrics 12 and 18 at the ring-free end of the tube (but not the prefiltering fabric 40 or the transport material 14) were then inserted into an approximately 1.6 cm diameter compression die. A pressure of 600 to 1000 bar was applied to the die at ambient temperature, thus fusing the ends of the filtering fabrics and sleeve to provide a flexible filter bag 48 as shown in FIG. 5. The seal 45 was approximately 2.5 cm in length, and the material beyond the seal was trimmed off. Continuity of the seal was ensured by securing it with a #198R metal clamp 46 available from the Oetiker Co., Livingston, N.J. The finished bag 48 was about 81 cm in length.

Performance of the flexible filter bag 48 was established in a high-pressure filter vessel to remove a controlled particulate slurry from a challenge flow of water. The pressure filter vessel was Model S-122 from Filtration Systems Corp., West Babylon, N.Y. which is representative of vessels currently being used for filtering liquids with flexible filter bags. The particulate slurry was a suspension of AC Fine Air Cleaner Test Dust (available from A.C. Spark Plug Division, General Motors Corp., Flint, Mich.) at a concentration of 2.6 g per liter, which was introduced into the challenge flow upstream to the test filter bag at a rate of about 7.5 liters per minute. The challenge flow consisted of a recirculating volume of about 450 liters which was maintained at a flow rate of 94 liters per minute. The filtrate emerging from the filter housing was directed to a holding tank, from which it was recirculated. The pressure drop across the filter bag was monitored, and the test was terminated when the system attained a pressure of 2000 milibars, whereupon the loading was calculated to be 450 grams.

Similar testing of commercially available flexible filter bags of comparable efficiency and size demonstrated loading capacities of less than 100 grams under these test conditions.

Efficiency was determined as described in the above-cited 3M Product Bulletin #1 except at a controlled fow rate of 10 gallons per minute. Average results of seven test bags are reported in Table II.

EXAMPLE 2

A second flexible filter bag of the invention was constructed from a filtering fabric like that used in Example 1 except that it had not been drilled.

A strip of this filtering fabric (about 910 cm × 100 cm) was wrapped around a 17.5 cm diameter mandrel to form a tube of 20 convolutions. The tube was removed from the mandrel, a thin stainless steel ring like that used in Example 1 was fitted approximately 7.6 cm into one end of the tube 10, and the extending portion of the filtering fabric was folded inwardly over the ring to form a cuff. A sleeve approximately 19.5 cm in diameter and 220 cm in length had been formed from a piece of the cover material used in Example 1. The sleeve was slipped into the tube such that it extended approximately 110 cm beyond the ring-containing end of the tube, and the extension of the cover was pulled over the ring until it reached the ring-free end of the tube. Using a die, a pressure of between 600–1000 bar applied at ambient temperature sealed the ring-free ends of the tube and sleeve to provide a flexible filter bag having the same dimensions as that of Example 1. When tested as in Example 1, its efficiency was as reported in Table II.

TABLE II

| Efficiency at | Particle Size | | |
|---|---|---|---|
| | 5 μm | 10 μm | 16 μm |
| Example 1 (av. of 7 bags) | 95.0% | 99.6% | 99.9% |
| Example 2 (one bag) | 97.0% | 99.6% | 99.7% |

While the above examples utilized filtering material having the same pore size throughout the filter bag, it may be preferred to utilize filtering materials of progressively decreasing pore sizes in downstream layers.

In a flexible filter bag of the invention, the flexible filtering fabric can be replaced by a particle-loaded microfiber sheet as described in U.S. Pat. No. 3,971,373 (Braun) to act upon a fluid passing through the bag. For example, the microfiber sheet can incorporate materials such as water or oil scavengers, decolorizing agents, chlorinating agents, or catalysts. Furthermore, a bag made of convolutions of flexible filtering fabric incorporating one or more such agents can have such a function in addition to a filtering function.

I claim:

1. Flexible filter bag useful for filtering a fluid under pressure and comprising
a strip of flexible filtering fabric having a longitudinal edge and wound upon itself in a large number of convolutions to provide a tube with said edge overlying itself, one end of the tube being secured to a structural ring to provide an open throat, and the ring-free end of the tube being sealed together to provide a flexible filter bag that has a seamless filter element and is open only at said ring.

2. Flexible filter bag useful for filtering a fluid under pressure and comprising
a flexile filtering fabric wound upon itself in a large number of convolutions to provide a tube, one end of the tube being secured to a structural ring to provide an open throat and said filtering fabric being folded inwardly around the ring to form a cuff at said open throat, a flexible, fluid-permeable sleeve covering the outer face of said tube and extending around said cuff, and the ring-free end of the tube being sealed together to provide a flexible filter bag that has a seamless filter element and is open only at said ring.

3. Flexible filter bag as defined in claim 2 wherein said sleeve is formed of thermoplastic fibers and its free ends are sealed together with the flexible filtering fabric at the ring-free end of the tube.

4. Flexible filter bag as defined in claim 3 wherein at least one convolution of said filtering fabric is provided with a plurality of openings, each of a size greater than contaminant in the fluid to be filtered, and a convolution of filtering fabric which is downstream of said at least one convolution is free from such openings, so that a portion of the fluid can reach said downstream convolution before being filtered by said at least one convolution of said filtering fabric.

5. Flexible filter bag as defined in claim 4 wherein each of a plurality of convolutions of said filtering fabric is provided with a plurality of openings, the total area of the openings in each opening-containing convolution being smaller tha that of openings in any upstream convolution of said filtering fabric.

6. Flexible filter bag as defined in claim 5 wherein adjacent opening-containing convolutions of said filtering fabric are separated by a flexible, nonfiltering, fluid-permeable transport material.

7. Flexible filter bag as defined in claim 6 wherein the sleeve includes an inner portion formed of a material of a porosity to filter out from the fluid substantially all particles that could otherwise become lodged in the transport material without filtering out significantly smaller particles.

8. Flexible filter bag as defined in claim 7 wherein said inner portion and an outer portion of said sleeve are joined at a circumferential seam that is positioned on the inner face of the tube of filtering fabric close to the ring.

9. Flexible filter bag useful for filtering a fluid under pressure and comprising
a flexible filtering fabric of thermoplastic fibers, which fabric is wound upon itself in a large number of convolutions to provide a tube, one end of the tube being folded inwardly around a structural ring to form a cuff, the other end of the tube being gathered in the manner of a sausage casing and sealed,
a flexible, fluid-permeable sleeve extending around said cuff and covering both faces of said tube, and
means for securing the ends of the sleeve to the sealed end of the tube so that the sleeve and tube together form a flexible filter bag that has a seamless filter element and is open only at said ring.

10. Flexible filter bag as defined in claim 9 wherein a least one convolution of said filtering fabric is provided with a plurality of openings, each of a size greater than contaminant in the fluid to be filtered, and a convolution of filtering fabric which is downstream of said at least one convolution is free from such openings, so that a portion of the fluid can reach said downstream convolution before being filtered by said at least one convolution of said filtering fabric.

11. Flexible filter bag as defined in claim 10 wherein adjacent opening-containing convolutions of said filtering fabric are separated by a flexible, nonfiltering, fluid-permeable transport material.

12. Flexible filter bag as defined in claim 11 wherein the sleeve includes an inner portion formed of a material of a porosity to filter out from the fluid substantially all particles that could otherwise become lodged in the transport material without filtering out significantly smaller particles.

13. Flexible filter bag as defined in claim 10 wherein any convolution of filtering fabric that is provided with said openings is positioned radially outward from said downstream convolution, and the bag is adapted to be fitted over a filter basket.

14. Flexible filter bag as defined in claim 10 wherein any convolution of filtering fabric that is formed with said openings is positioned radially inward from said downstream convolution, and the bag is adapted to be inserted into a filter basket.

15. Flexible filter bag as defined in claim 10 wherein each of a plurality of convolutions of said filtering fabric is provided with a plurality of openings, the total area of the openings in each opening-containing convolution being smaller than that of openings in any upstream convolution of said filtering fabric.

16. Flexible filter bag as defined in claim 9 wherein the filtering fabric comprises thermoplastic fibers.

17. Flexible filter bag as defined in claim 16 wherein the thermoplastic fibers of the filtering fabric are blown microfibers.

18. Method of making a flexible filter bag comprising the steps of:
(1) wrapping onto a cylindrical mandrel a number of convolutions of a flexible filtering fabric of fusible fibers to provide a tube,
(2) removing the tube from the mandrel,
(3) fitting a structural ring into one end of the tube,
(4) folding said one end of the tube inwardly around the ring to provide a cuff,
(5) forming a flexible, fluid-permeable sleeve of a diameter approximating that of the tube and a length greater than that of the tube,
(6) fitting the sleeve around the tube to cover the outer face of said tube and extending around the ring end of the tube, and
(7) compressing the free ends of said sleeve and tube to seal the fibers of the tube and to secure the ends of said sleeve to the sealed end of the tube, thus forming a substantially cylindrical bag that has a seamless filter element and is open only at said ring.

19. Method of making a flexible filter bag as defined in claim 14 wherein a portion of the filtering fabric at least equal in length to the circumference to the tube is formed with a plurality of openings, each of a size greater than contaminant in a fluid to be filtred, and another portion of the filtering fabric at least equal in length to the circumference to the tube is free from such openings, and in step (1) the filtering fabric is wrapped so that each opening-containing convolution is upstream of each opening-free convolution.

20. Method of making a flexible filter bag as defined in claim 19 wherein in step (1) a flexible, fluid-permeable, nonfiltering transport material is convolutely wound with the filtering fabric to separate adjacent opening-containing convolutions of the filtering fabric while teminating short of the both the folded formed in step (4) and the free ends of the tube that are compressed in step (7).

21. Method of making a flexible filter bag as defined in claim 18 wherein the transport material is substantially equal in length to the open-containing convolution of the filtering fabric.

22. Method of making a flexible filter bag as defined in claim 21 wherein the sleeve includes an inner portion formed of a material of a porosity to filter out from the fluid substantially all particles that could otherwise become lodged in the transport layer without filtering out significantly smaller particles.

23. Method of making a flexible filter bag as defined in claim 14 wherein the sleeve is formed from fusible fibers, and step (7) involves fusing the fibers of the sleeve with fibers of the filtering fabric.

24. Method of making a flexile filter bag as defined in claim 14 wherein the fibers of the filtering fabric are blown microfibers.

* * * * *

UNITED STATES PATENT AND TRADEMARK OFFICE
CERTIFICATE OF CORRECTION

PATENT NO. : 4,877,526

DATED : October 31, 1989

INVENTOR(S) : Todd W. Johnson and Corazon C. Brizuela

It is certified that error appears in the above-identified patent and that said Letters Patent is hereby corrected as shown below:

Column 3, line 7, correct "fist" to --first--.

Column 10, Claim 19, line 13, correct "14" to --18--.

Column 10, Claim 19, line 16, correct "filtred" to --filtered--.

Column 10, Claim 20, line 27, correct "folded" to --fold--.

Column 10, Claim 21, line 31, correct "18" to --20--.

Column 10, Claim 23, line 41, correct "14" to --18--.

Column 10, Clai

Signed and Sealed this

Second Day of April, 1991

*Attest:*

HARRY F. MANBECK, JR.

*Attesting Officer*    *Commissioner of Patents and Trademarks*